(12) United States Patent
Sui

(10) Patent No.: US 9,783,046 B2
(45) Date of Patent: Oct. 10, 2017

(54) VALVE DEVICE FOR FUEL TANK

(75) Inventor: Xiaohui Sui, Tama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 1515 days.

(21) Appl. No.: 13/514,486

(22) PCT Filed: Dec. 9, 2010

(86) PCT No.: PCT/JP2010/072149
§ 371 (c)(1),
(2), (4) Date: Jul. 16, 2012

(87) PCT Pub. No.: WO2011/074478
PCT Pub. Date: Jun. 23, 2011

(65) Prior Publication Data
US 2016/0243932 A1    Aug. 25, 2016

(30) Foreign Application Priority Data
Dec. 17, 2009 (JP) .................... 2009-286400

(51) Int. Cl.
*F16K 24/04* (2006.01)
*B60K 15/035* (2006.01)

(52) U.S. Cl.
CPC ...... B60K 15/03519 (2013.01); *F16K 24/042* (2013.01); *F16K 24/044* (2013.01);
(Continued)

(58) Field of Classification Search
CPC ... F16K 24/042; F16K 24/044; B60K 15/035; B60K 15/03519; B60K 2015/03566; Y10T 137/3099
(Continued)

(56) References Cited

U.S. PATENT DOCUMENTS 5,392,804 A * 2/1995 Kondo ............. B60K 15/03519
123/519
5,535,772 A * 7/1996 Roetker ........... B60K 15/03519
137/202
(Continued)

FOREIGN PATENT DOCUMENTS

JP    H04-356229 A    12/1992
JP    H07-293384 A    11/1995
(Continued)

OTHER PUBLICATIONS

Europe Patent Office, "European Search Report for EP 10837506.4," Apr. 14, 2014.
(Continued)

*Primary Examiner* — Jessica Cahill
*Assistant Examiner* — Ian Paquette
(74) *Attorney, Agent, or Firm* — Manabu Kanesaka

(57) ABSTRACT

A valve device for fuel tank has a case having an air flow valve orifice connected to outside of the tank at an upper part and a fuel inflow part beneath this air flow valve orifice, and being divided into an upper chamber and a lower chamber by a partition formed between the air flow valve orifice and the inflow part; an upper float body being inside the upper chamber and ascending by fuel flowing into the case to be seated in the air flow valve orifice; and a lower float body being supported inside the lower chamber of the case with an upwardly projecting guide shaft being inserted to be movable vertically inside an insertion part formed on the partition, and ascending by fuel flowing into the case to close a main connect-through part between the lower chamber and the upper chamber formed on the partition. A receiving hole for receiving the guide shaft of the lower float body is provided on the upper float body.

6 Claims, 7 Drawing Sheets

(52) U.S. Cl.
CPC ............... *B60K 2015/03566* (2013.01); *Y10T 137/3099* (2015.04)

(58) Field of Classification Search
USPC ........................................................ 137/202
See application file for complete search history.

(56) References Cited

U.S. PATENT DOCUMENTS

| | | | |
|---|---|---|---|
| 5,577,526 A | 11/1996 | Kasugai et al. | |
| 2004/0187923 A1 | 9/2004 | Nishi | |
| 2006/0065305 A1 | 3/2006 | Nojiri et al. | |
| 2008/0251134 A1* | 10/2008 | Miura | F16K 24/044 137/409 |
| 2010/0224265 A1 | 9/2010 | Kobayashi et al. | |
| 2013/0075394 A1* | 3/2013 | Suzuki | F16K 24/044 220/86.2 |

FOREIGN PATENT DOCUMENTS

| | | |
|---|---|---|
| JP | 2004-044525 A | 2/2004 |
| JP | 2005-308216 A | 11/2005 |
| JP | 2007-253778 A | 10/2007 |
| JP | 2009-083766 A | 4/2009 |

OTHER PUBLICATIONS

Korea Patent Office, Office Action for KR 10-2012-7016709, Sep. 30, 2013.

* cited by examiner

VALVE DEVICE FOR FUEL TANK

TECHNOLOGICAL FIELD

This invention relates to an improvement of a valve device being installed on a fuel tank of an automobile, motorcycle, or the like, and functioning to connect through between the inside and outside of the tank in an open-valve state.

BACKGROUND TECHNOLOGY

An example of a valve having full-tank detecting means for a fuel tank is given in patent document 1. This valve has a first valve chamber connecting through to the inside of the fuel tank, and a second valve chamber connecting through to the first valve chamber and the outside, respectively, on top of this first valve chamber. In the first valve chamber, a first float is guided to be movable vertically so as to insert a guide projection into a guide hole formed on a valve chamber side wall. With this valve, the size of the first float can be made comparatively small in the vertical direction by such guide means, and the overall vertical size of the valve is made compact.

However, in this valve, when the fuel level reaches a height to let fuel into the first valve chamber, the first float ascends and closes the main connection channel with the second valve chamber, the fuel level inside the filler pipe is raised by a consequent increase, of pressure inside the tank, and an initial full-tank state is detected by a sensor in the fueling gun, but because the first float is guided by the aforementioned means, there are the following two problems:

(1) Because the clearance between the side face of the first float and the valve chamber side wall of the first valve chamber cannot be made large, both sides tend to contact each other due to running of the vehicle and produce a strange sound during descent of the first float.

(2) In the case when the first float becomes tilted, the first float may bite into the valve chamber side wall of the first valve chamber and become unmovable.

PRIOR ART DOCUMENTS

Patent Documents

Patent Document 1: Japanese Unexamined Patent Publication No. 2006-266096

SUMMARY OF THE INVENTION

Problem to Be Solved by the Invention

A main problem to be solved by this invention is to make smooth movement of a float valve body on a lower side, that is, a lower float body for detecting an initial full-tank state, while making the dimension in the vertical direction as compact as possible, in this kind of valve device for fuel tank.

Means for Solving the Problem

In order to solve the aforementioned problem, in this invention, a valve device for fuel tank is a valve device to be installed and used on a fuel tank.

A case has an air flow valve orifice connected to outside of the tank at an upper part, and a fuel inflow part below the air flow valve orifice. The case is divided into an upper chamber and a lower chamber by a partition formed between the air flow valve orifice and the inflow part.

An upper float body is disposed inside the upper chamber of the case and ascending by fuel flowing into the case to be seated in said air flow valve orifice.

A lower float body has an upwardly projecting guide shaft, supported inside the lower chamber of the case with the guide shaft being inserted to be movable vertically inside an insertion part formed on said partition, and ascends by fuel flowing into the case to close a main connect-through part between the lower chamber and the upper chamber formed on said partition.

A receiving hole for receiving the guide shaft of the lower float body is provided on said upper float body.

When the fuel level reaches the inflow part of the case by fueling, the fuel enters the lower chamber due to a differential pressure between the pressure inside the tank and the pressure inside the case, the lower float body ascends, the main connect-through part is closed thereby, the fuel level inside the filler pipe is raised by the pressure increase inside the tank, and an initial full-tank state is detected by a sensor in the fueling gun. When fueling stops upon detection of the initial full-tank state, because the lower float body remains in the main connect-through part to close, the internal pressure inside the tank decreases by air flow passing through the air flow valve orifice, and additional fueling becomes possible. By this, the fuel level inside the filler pipe is raised again by the pressure increase inside the tank, and a final full-tank state is detected by the sensor inside the fueling gun. When the fuel level drops, first the fuel flows out from the upper chamber, the upper float body descends, and the air flow valve orifice is opened. Next, when the fuel level drops further, the lower float body descends, and the main connect-through part is opened. Because the lower float body is supported with the guide shaft being passed through the insertion part provided on the partition, a gap is created between the side face of the lower float body and the inside face of the lower chamber and contact between the two can be prevented. Also, because the receiving hole for receiving the guide shaft is provided on the upper float body, the size in the vertical direction of the valve device configured with the upper float body and the lower float body can be made as small as possible. One preferable embodiment is one in which the guide shaft of the lower float body is received in the receiving hole of the upper float body when the upper float body has not ascended, that is, is in the descended position and the lower float body has ascended.

If the insertion part provided on the partition has a part for sliding-contact with the guide shaft at least on an upper end side and on a lower end side thereof, then the vertical movement of the lower float body can be made smooth without tilting by the support on at least two points vertically.

Also, if a head part is provided on an upper end of the guide shaft, and a coupling part for allowing passage from below the head part of the guide shaft by elastic deformation is formed on an upper end of the insertion part, then the lower float body can be combined easily and appropriately on the partition, and can be supported in a suspended manner on this partition.

Also, if at least a portion of the coupling part of the insertion part is configured with an arm piece projecting sideways from an upper end of an upwardly projecting base part piece so that the projecting end is coupled with the head part, then the collision of the head part being contacted from above with the arm piece when the lower float body in the ascended position descends can be absorbed by elastic deformation of the arm piece, and production of a sound of collision in this case can be prevented. Also, if a place on the upper part of the lower float body contacting with the partition at least when ascending is covered by an elastic material, then the collision of the contact of the lower float body to the partition when the lower float body in the descended position ascends can be absorbed by the elastic sealing material as the elastic material, and production of a sound of collision in this case also can be prevented.

Effect of the Invention

According to this invention, in a valve device having two float bodies functioning as float valve bodies above and below, the movement of the lower float body for detecting an initial full-tank state can be made smooth while being able to make the dimension in the vertical direction as compact as possible.

EMBODIMENTS OF THE INVENTION

Figure 1:
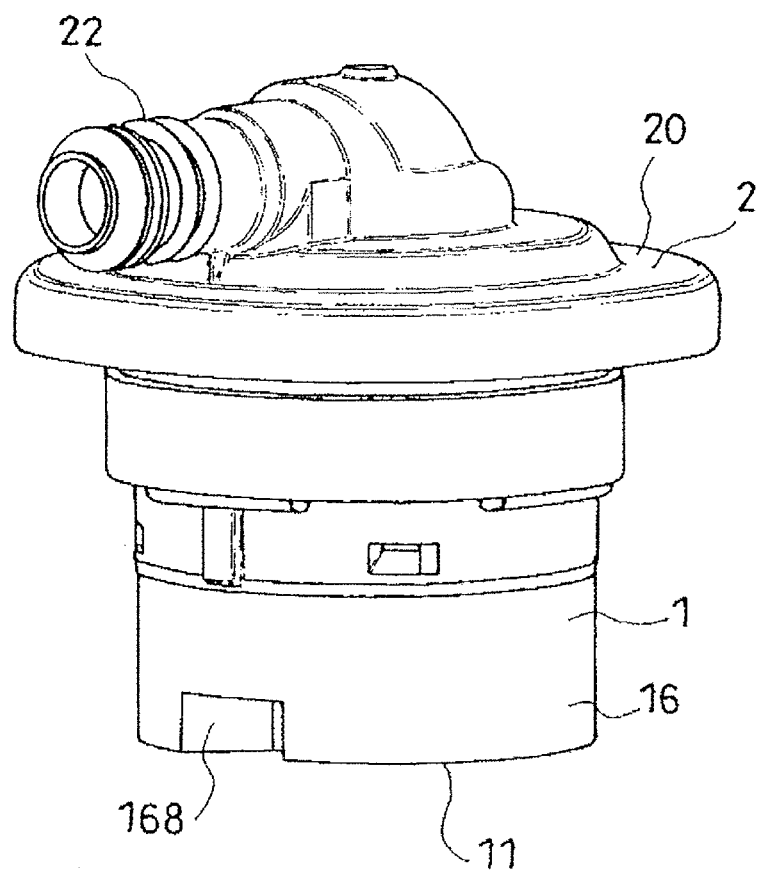
FIG. 1 is a perspective view of a valve device for fuel tank according to one embodiment of this invention.

A typical embodiment of this invention is described below based on FIGS. 1 to 10. The valve device for fuel tank according to this embodiment is installed on a fuel tank T of an automobile, motorcycle, or the like, and functions to connect through between the inside and outside of the tank in the open-valve state.

Such valve device typically is installed on an upper part of the fuel tank T, and constitutes a portion of a connection channel air flow channel E) to the fuel tank T. In addition, the valve device according to this embodiment functions to block the connection through between the inside and the outside of the tank by utilizing a rise of the fuel level due to injection of fuel F into the fuel tank T, so that the fuel level inside the filler pipe is raised by a consequent increase of pressure inside the tank and a full-tank state is detected by a sensor in the fueling gun.

More specifically, in the valve device according to this embodiment, firstly, when the fuel level inside the fuel tank T reaches a prescribed first level fa, a lower float body 5 to be described is caused to ascend to throttle, so to say, the air flow channel E, the fuel level inside the filler pipe not illustrated is raised by a consequent increase of pressure inside the fuel tank T, and an initial full-tank state is detected by a sensor in the fueling gun. Next, secondly, after fueling is stopped by the detection of this initial full-tank state, the pressure inside the tank decreases by air flow passing through the throttled air flow channel E, the fuel level inside the filler pipe drops, and additional fueling is allowed. Also, thirdly, when the fuel level inside the fuel tank T reaches a prescribed second level fb higher than the first level fa by this additional fueling, an upper float body 3 to be described is caused to ascend and the air flow channel E is closed, the fuel level inside the filler pipe is raised by a consequent increase of pressure inside the fuel tank T, and a final full-tank state is detected by the sensor in the fueling gun.

Such valve device has a case 1, an upper float body 3, and a lower float body 5.

The case 1 has an air flow valve orifice 10 opening a passage with outside of the tank at an upper part, and has a fuel inflow part 11 beneath this air flow valve orifice, and is divided into an upper chamber 13 and a lower chamber 14 by a partition 12 formed between the air flow valve orifice 10 and the inflow part 11.

In the illustrated example, such case 1 is configured with an upper body 15 and a lower body 16. The upper body 15 is configured to have a cylindrical form. The cylinder upper end of the upper body 15 is closed by a ceiling part 15a having a circular air flow valve orifice 10 in the center. On the upper face of the ceiling part 15a, a short cylindrical part 15b projecting upward from the ceiling part 15a is integrally formed with the ceiling part 15a with the space inside the cylinder connecting through to the air flow valve orifice 10. A sealing 15c is fitted on the outside of the short cylindrical part 15b. The cylinder lower end of the upper body 15 is open.

Meanwhile, the lower body 16 is configured to have a cylindrical form with the cylinder upper and lower ends both being open. A dividing wall 160 dividing the space inside the lower body 16 into upper and lower parts is formed between the cylinder upper and lower ends of the lower body 16. A circular through-hole 161a is formed in the center part of the dividing wall 160, and this through-hole 161a serves as a main connect-through part 161 to be described. Also, a through-hole 162a serving as an auxiliary connect-through part 162 to be described, being smaller than the through-hole 161a, is formed in both side positions surrounding the through-hole 161a.

Also, a disk-form body 163 having an outer diameter roughly equal to the hole diameter of the through-hole 161a is placed directly above the through-hole 121a of the dividing wall 160, such that the outer edge thereof overlaps on the hole edge of the through-hole 161a in the condition in plan view, and such that a gap is opened in the vertical direction between the lower face of the disk-form body 163 and the upper face of the dividing wall 160. In the illustrated example, bridge pieces 164 spanning between the disk-form body 163 and the dividing wall 160 are provided in four places opening spaces in the direction around the center of the disk-form body 163, such that the disk-form body 163 is supported on the dividing wall 160 as previously mentioned by these bridge pieces 164 in four places. In the illustrated example, the partition 12 is constituted by such dividing wall 160 and disk-form body 163.

Also, an insertion part 165 to be described is formed in the center of the disk-form part 163. The insertion part 165 is configured with an insertion hole 164a provided in a condition running through the center of the disk-form body 163, and a cylindrical support part 165b projecting upward from the upper face of the disk-form body 163 such that the cylinder lower end is connected through to the insertion hole 165a. The cylindrical support part 165b is divided into four parts by providing slits spanning between the cylinder upper end and the cylinder lower end in four places opening spaces in the direction around the cylinder shaft, and each divided place functions as an elastic piece 165c.

Also, a plurality of projections, 166, 166, . . . is formed on the upper face of the disk-form body 163, opening roughly equal spaces between adjacent projections 166 on an arc of a virtual circle surrounding the cylindrical support part 165b, and the spring lower end of a compression coil spring 4 to be described is combined on the disk-form body 163 such that the array of these projections 166, 166, . . . is received inside this spring lower end.

Also, an inner cylinder part 167 is placed beneath the dividing wall 160 of the lower body 16. The cylinder upper end of this inner cylinder part 167 is integrally connected to the lower face of the dividing wall 160 such that the main connect-through part 161 is positioned inside the cylinder upper end. Also, the cylinder lower end of the inner cylinder part 167 is positioned on the same level as the cylinder lower end of the lower body 16.

Also, a cutout part 168 splitting a part of the outer shell of the lower body 16 is formed on the cylinder lower end side of the lower body 16 in a position to become directly beneath the auxiliary connect-through part 162. This cutout part 168 is open at the cylinder lower end of the lower body 16, and the upper end of the cutout part 168 is positioned above the cylinder lower end of the inner cylinder part 167 and beneath the partition 12.

In the illustrated example, the case 1 is constituted with the upper body 15 being fitted from the cylinder lower end side, inside a place on such lower body 16 above the dividing wall 160. In the case 1 thus constituted, the cylinder lower end of the lower body 16 and the cutout part 168 function as the inflow part 11.

Also, in the illustrated example, such case 1 is combined on a flange 2 so as to be installed on the fuel tank T using this flange 2. The flange 2 has a head part 20 and a cylindrical connection part 21 projecting downward from the head part 20. A connection tube part 22 projecting to the side is integrally provided on the head part 20, and this connection tube part 22 is connected through with the space inside the cylindrical connection part 21 in the center of the head part 20. This connect-through part is surrounded by a circumferential raised part 23 on the inside of the flange 2. In the illustrated example, the flange 2 and the case 1 are integrated by fitting the upper part of the upper case 1 inside the cylindrical connection part 21 of the flange 2 such that the short cylindrical part 15b of the upper body 15 is inserted inside the circumferential raised part 23 of the flange 2. The space between the short cylindrical part 15b of the upper body and the circumferential raised part 23 of the flange 2 is sealed air-tightly by the sealing 15c. By this, the inside and outside of the tank are connected through by way of the inflow part 11 of the case 1, the air flow valve orifice 10, and the connection tube part 22. The case 1 is placed inside the tank by being inserted from outside into an installation hole Ta being opened on the fuel tank T and having a size such that the head part 20 of such flange 2 does not fit, and is attached to the fuel tank T by welding or otherwise fixing the head part 20 of the flange 2 on the outer face part of the fuel tank T.

Figure 2:
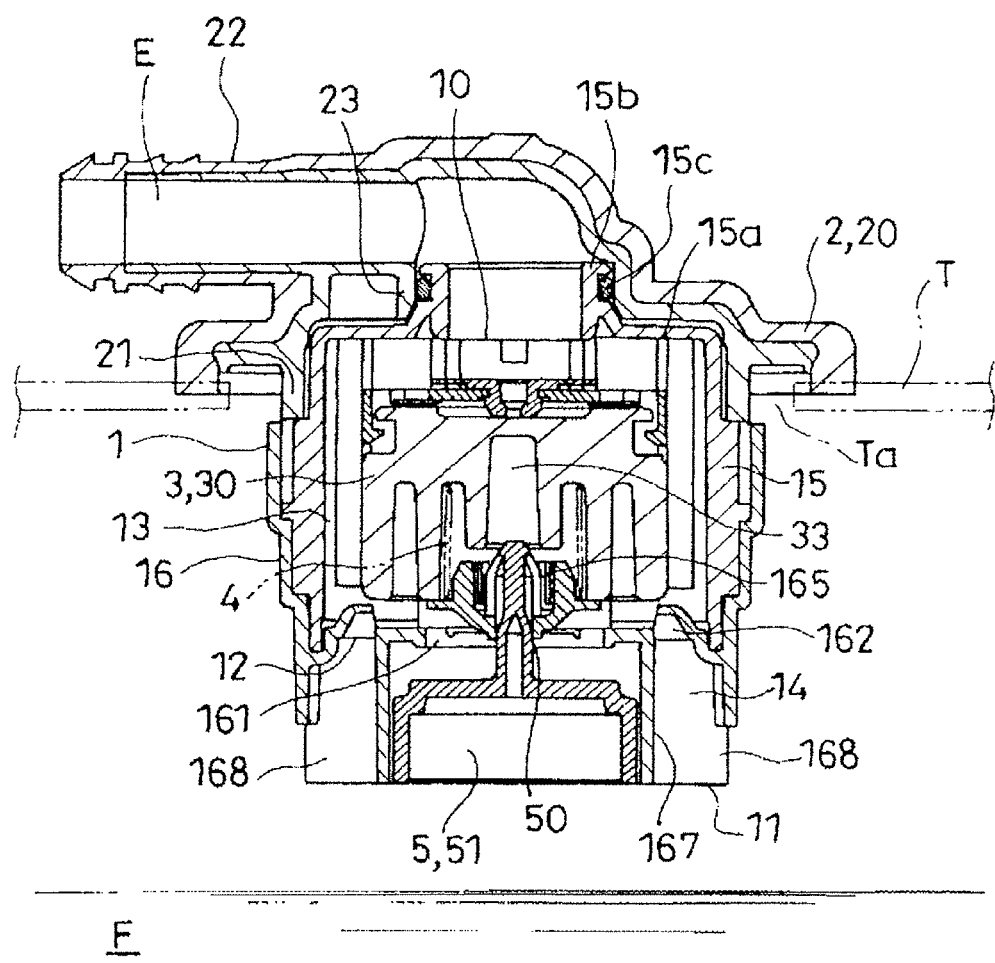
FIG. 2 is a sectional view of the valve device, and specifically illustrates the state in which the fuel level inside the tank has not reached the level of the inflow part provided on the lower end of the valve device.
Figure 3:
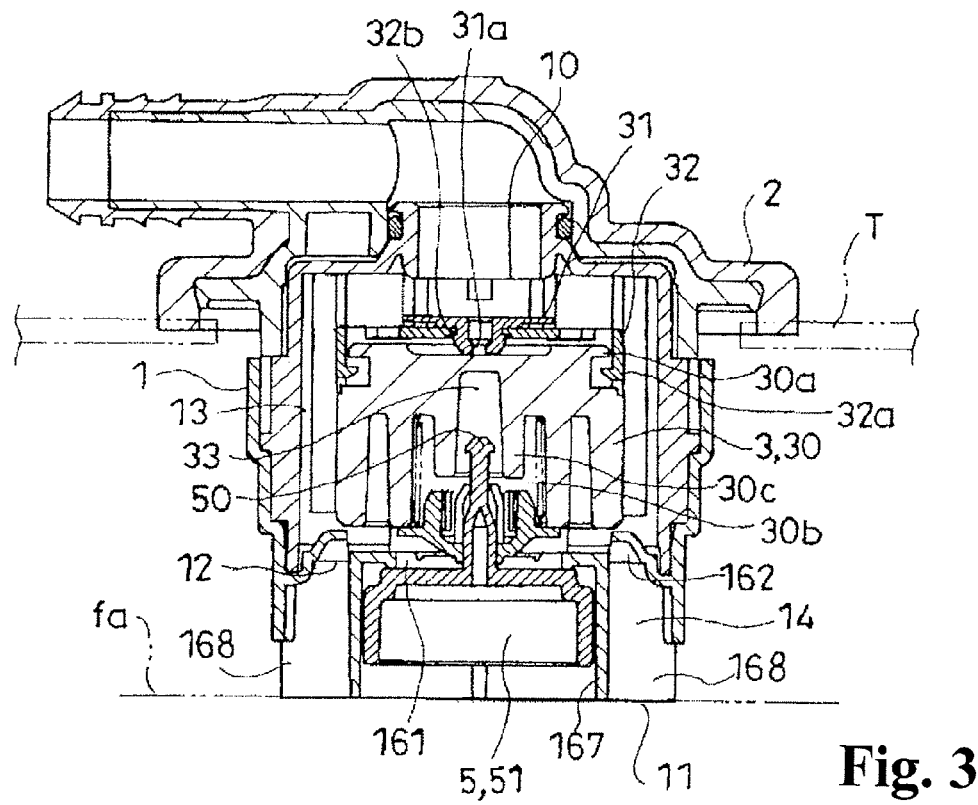
FIG. 3 is a sectional view of the valve device, and specifically illustrates the state in which the fuel level inside the tank reached the level of a cylinder lower end of an inner cylinder part serving as the inflow part provided on the lower end of the valve device.

The upper float body 3 is inside the upper chamber 13 of the case 1 and ascends by fuel flowing into the case 1 to be seated in said air flow valve orifice 10. In the state in which fuel has not flowed into the upper chamber 13, the upper float body 3 is in the descended position being supported on the disk-form body 163 constituting the partition 12 of the lower body 16, and the air flow valve orifice 10 is open (FIGS. 2 and 3).

In the illustrated example, such upper float body 3 has a float main body 30 having a ceiling part and a cylindrical-form side part, a seal member 31 for sealing the air flow valve orifice 10, and a support member 32 for this seal member 31. The support member 32 is constituted as a disk form in general, having an outwardly projecting coupling claw 32a on the outer perimeter part and a through-hole 32b in the center part. A part 30a coupled with, on which is coupled the coupling claw 32a of such support member 32, is formed on the outer perimeter part of the ceiling part of the float main body 30, and the support member 32 is placed on the ceiling part of the float main body 30 in a state in which the coupling claw 32a is coupled on this part 30a coupled with. The seal member 32 is formed in a disk form having an outer diameter sufficient to close the air flow valve orifice 10, and has an insertion-fitting projecting part 31a for insertion-fitting into the through-hole 32b of the support member 32 in the center of the lower part, and is combined on the support member 32 using this insertion-fitting projecting part 31a so as to be positioned directly beneath the air flow valve orifice 10.

A receiving hole 33 in which a guide shaft 50 to be described of the lower float body 5 is received is provided on such upper float body 3. This receiving hole 33 is formed inside a recessed place 30b formed in the center of the lower part of the float main body 30 of the upper float body 3. This recessed place 30b is formed in a circular pit form. A boss-form part 30c projecting downward from the upper floor of this recessed place 30b is formed inside this recessed place 30b. The lower end of the boss-form part 30c is positioned beneath the cylinder lower end of the upper float body 3 such that the cylindrical support part 165b and the array of projections 166, 166, . . . are received inside the recessed place 30b beneath the lower end of this boss-form part 30c during descent of the upper float body 3 (FIGS. 2 and 3). Also, the compression coil spring 4 is installed in a compressed state inside this recessed place 30b such that the boss-form part 30c is received inside. The spring lower end of this spring 4 contacts the dividing wall 160 of the lower body 16, and the spring upper end contacts the upper floor of the recessed place 30b, such that a constant upward force is applied to the upper float 3 by this spring 4.

The lower float body 5 has an upwardly projecting guide shaft 50, is supported inside the lower chamber 14 of the case 1 with this guide shaft 50 being inserted to be movable up and down from the side of this lower chamber 14 inside the insertion part 165 formed on the partition 12, and ascends by fuel flowing into the case 1 to close the main connect-through part 161 between the lower chamber 14 and the upper chamber 13 formed on the partition 12.

In the illustrated example, such lower float body 5 has a float main body 51 received to be movable vertically inside the inner cylinder part 167 of the lower case 1, and the guide shaft 50. The float main body 51 is formed in a short cylindrical form, and is received inside the inner cylinder part 167 such that the cylinder shaft thereof is aligned in the vertical direction. The cylinder upper end of this float main body 51 is closed, and the cylinder lower end is open. The outer diameter of the lower float body 5 is larger than that of the main connect-through part 161 provided on the dividing wall 160 constituting the partition 12.

The guide shaft 50 has a head part 50$a$ on the upper end. Also, the outer diameter of a middle part 50$c$ between the head part 50$a$ and a base part 50$b$ is made roughly equal to the inner diameter of the cylinder upper end of the cylindrical support part 165$b$ constituting the insertion part 165, and the outer diameter of the base part 50$b$ is made roughly equal to that of the head part 50$a$ and wider than that of the middle part 500$c$, and is made roughly equal to the hole diameter of the insertion hole 165$a$ constituting the insertion part 165. Also, in this embodiment, the lower float body 5 is supported in a suspended manner on the partition 12 in a state in which the head part 50$a$ of the guide shaft 50, being passed through the cylindrical support part 165$b$ through the insertion hole 165$a$, is caught on the cylinder upper end of this cylindrical support part 165$b$. In this caught state, the lower float body 5 is in the most descended position, and the partition 12 and the cylinder upper end of the float main body are moved apart so that the main connect-through part 161 is open (FIG. 2).

Figure 4:
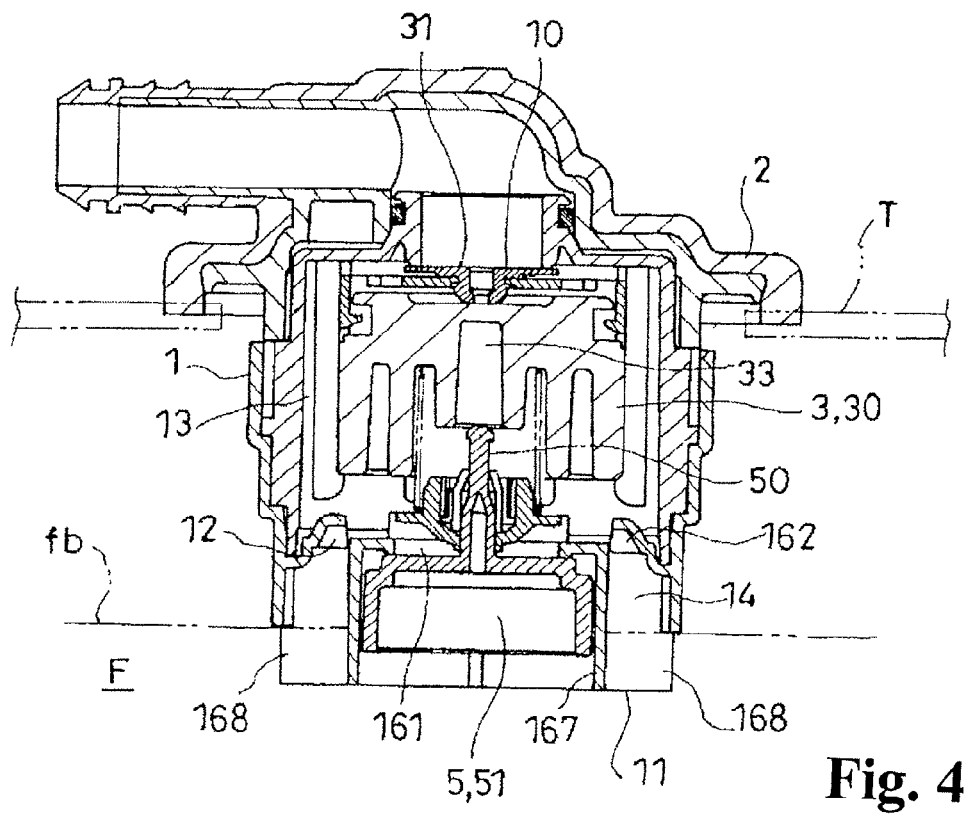
FIG. 4 is a sectional view of the valve device, and specifically illustrates the state (seated state) in which fueling was further performed from the state in FIG. 3 so that the fuel flowed into the case constituting the valve device and the upper float body ascended to close the air flow valve orifice.
Figure 5:
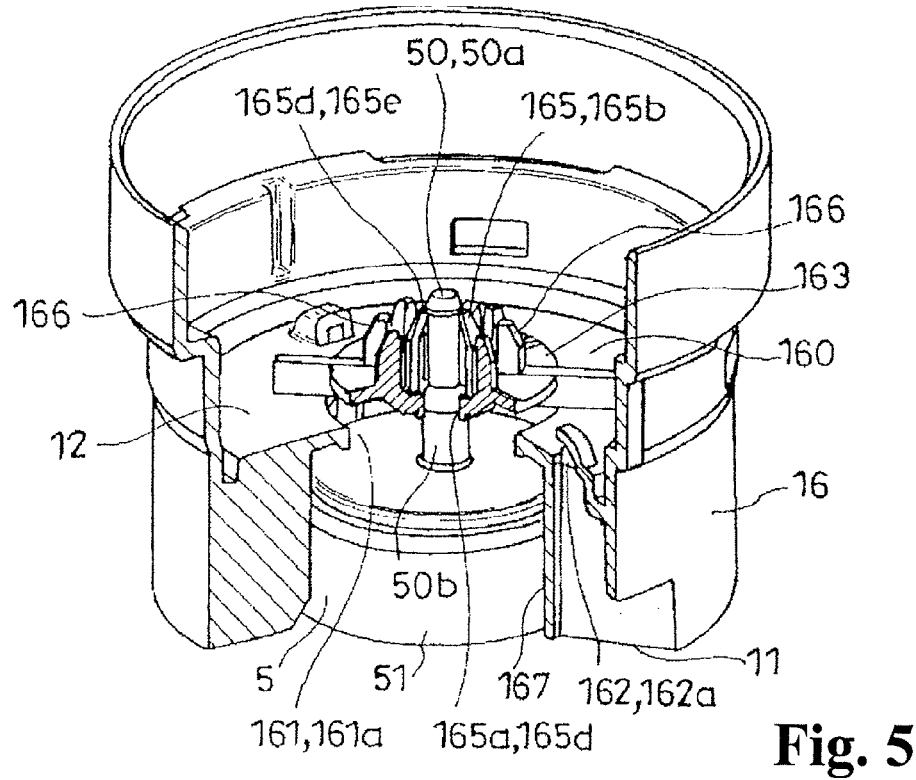
FIG. 5 is a perspective view illustrating in partial cutaway the lower body constituting the case, and the lower float body is in the descended position.
Figure 6:
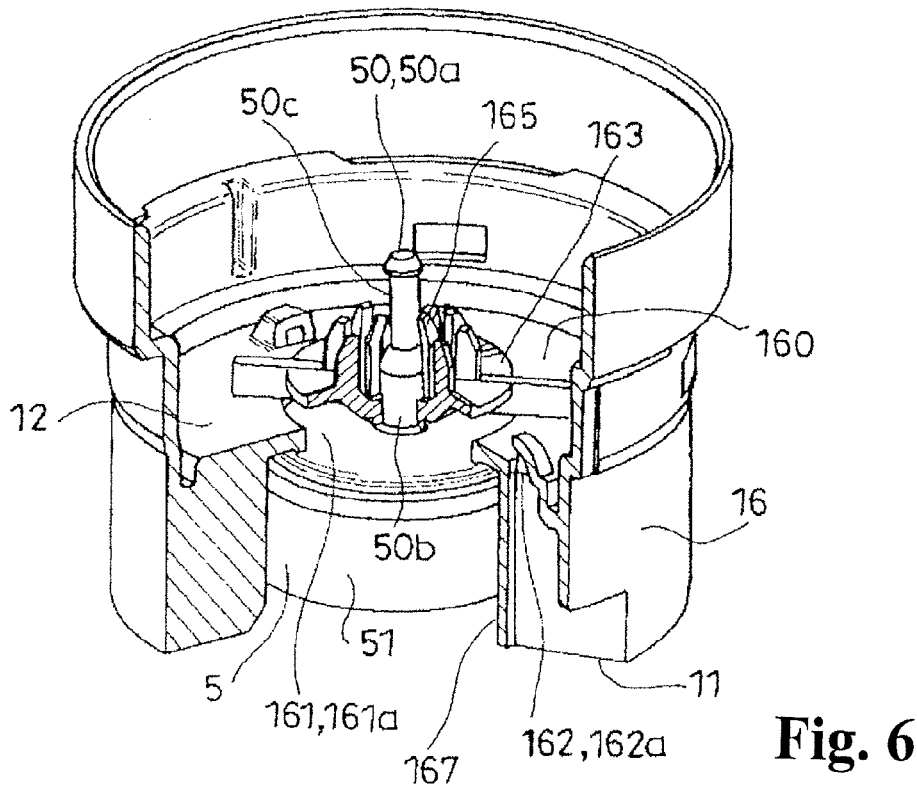
FIG. 6 is a perspective view illustrating in partial cutaway the lower body constituting the case, and the lower float body is in the ascended position.
Figure 7:
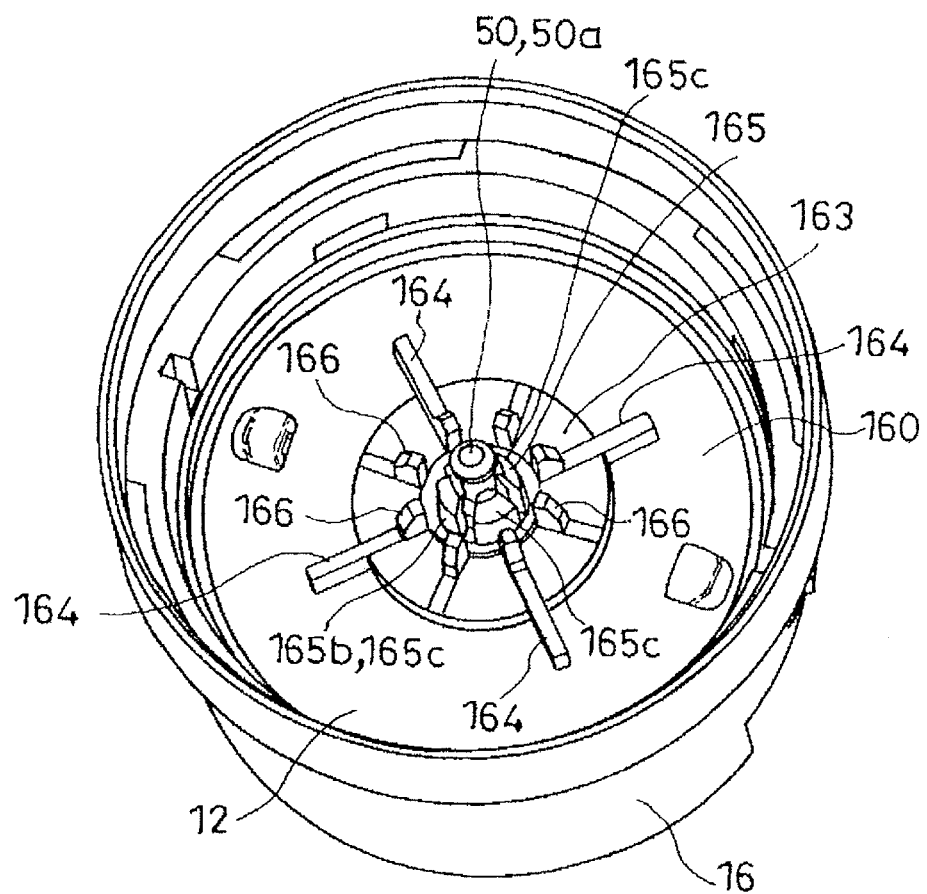
FIG. 7 illustrates the lower body constituting the case viewed from above.

The air flow between the inside and outside of the tank is assured through the inflow part 11, the main connect-through part 161, the auxiliary connect-through part 162, and the air flow valve orifice 10, until the fuel level reaches the inflow part 11 of the case 1. The air flow through the main connect-through part 161 is accomplished through the space between the side face of the float main body 51 of the lower float body 5 and the inside face of the inner cylinder part 167, the air flow through the auxiliary connect-through part 162 is accomplished through the cutout part 168, and the air flow through the air flow valve orifice 10 is accomplished through the space between the side part of the float main body 30 of the upper float body 3 and the inside face of the upper chamber 13 (FIG. 2). When the fuel level reaches the cylinder lower end of the inner cylinder part 167 constituting the inflow part 11 of the case 1 by fueling (first level fa), the fuel F enters the lower chamber due to a differential pressure between the pressure inside the tank and the pressure inside the case 1, the lower float body 5 ascends, the main connect-through part 161 is closed thereby, the fuel level inside the filler pipe is raised by the pressure increase inside the tank, and an initial full-tank state is detected by a sensor in the fueling gun. Specifically, at this time, the fuel enters the inner cylinder part 167, and the lower float body 5 ascends (FIG. 3). When fueling stops upon detection of the initial full-tank state, because the lower float body 5 remains to close the main connect-through part 161, the internal pressure inside the tank decreases by air flow, and additional fueling becomes possible. Specifically, additional fueling is allowed by air flow through the cutout part 168 and the auxiliary connect-through part 162. When the fuel level rises further by the additional fueling, the fuel enters the upper chamber 13, and the upper float body 3 ascends to be seated in the air flow valve orifice 10. By this, the fuel level inside the filler pipe is raised again by the pressure increase inside the tank, and a final full-tank state is detected by the sensor in the fueling gun. Specifically, when the fuel level reaches the upper end of the cutout part 168 (second level fb), the fuel enters the upper chamber 13 through the auxiliary connect-through part 162 by a differential pressure between the pressure inside the tank and the pressure inside the case 1 (FIG. 4). When the fuel level drops, first the fuel F flows out from the upper chamber 13, the upper float body 3 descends, and the air flow valve orifice 10 is opened. Next, when the fuel level drops further, the lower float body 5 descends, and the main connect-through part 161 is opened.

Because the lower float body 5 is supported with the guide shaft 50 being passed through the insertion part 165 provided on the partition 12, a gap is created between the side face of the lower float body 5 and the inside face of the lower chamber 14, in the illustrated example, the inside face of the inside cylinder part 167, and contact between the two can be prevented. Also, because the receiving hole 33 for receiving the guide shaft 50 is provided on the upper float body 3, the size in the vertical direction of the valve device configured with the upper float body 3 and the lower float body 5 can be made as small as possible. Specifically, in this embodiment, the guide shaft 50 of the lower float body 5 is received in the receiving hole 33 of the upper float body 3 when the upper float body 3 has not ascended, that is, is in the descended position and the lower float body 5 has ascended (FIG. 3).

Also, in this embodiment, the insertion part 165 provided on the partition 12 has a part 165$d$ for sliding-contact with the guide shaft 50 at least on an upper end side and on a lower end side thereof. Specifically, no matter what position the lower float body 5 is in, that is, whether it is in the ascended position closing the main connect-through part 161 or is in the descended position, the base part 50$b$ of the guide shaft 50 is slid contacting with the insertion hole 165$a$, and the middle part 50$c$ of the guide shaft 50 is slid contacting inside the cylinder upper end of the cylindrical support part 165$b$. By this, in this embodiment, the vertical movement of the lower float body 5 can be made smooth without tilting by the support on at least two points vertically.

Also, in this embodiment, a coupling part 165$e$ for allowing passage from beneath the head part 50$a$ of the guide shaft 50 by elastic deformation is formed on an upper end of the insertion part 165. In the illustrated example, the cylindrical support part 165$b$ is configured with four elastic pieces 165$c$, . . . , 165$c$, and when the guide shaft 50 is passed through the insertion part 165 from beneath through the insertion hole 165$a$, the four elastic pieces 165$c$, . . . , 165$c$ first flex outward and are then coupled with this head part 50$a$. That is, in the illustrated example, the upper ends of such elastic pieces 165$c$ function as the coupling part 165$e$. By this, in this embodiment, the lower float body 5 can be combined easily and appropriately onto the partition 12, and can be supported in a suspended manner on this partition 12.

Figure 8:
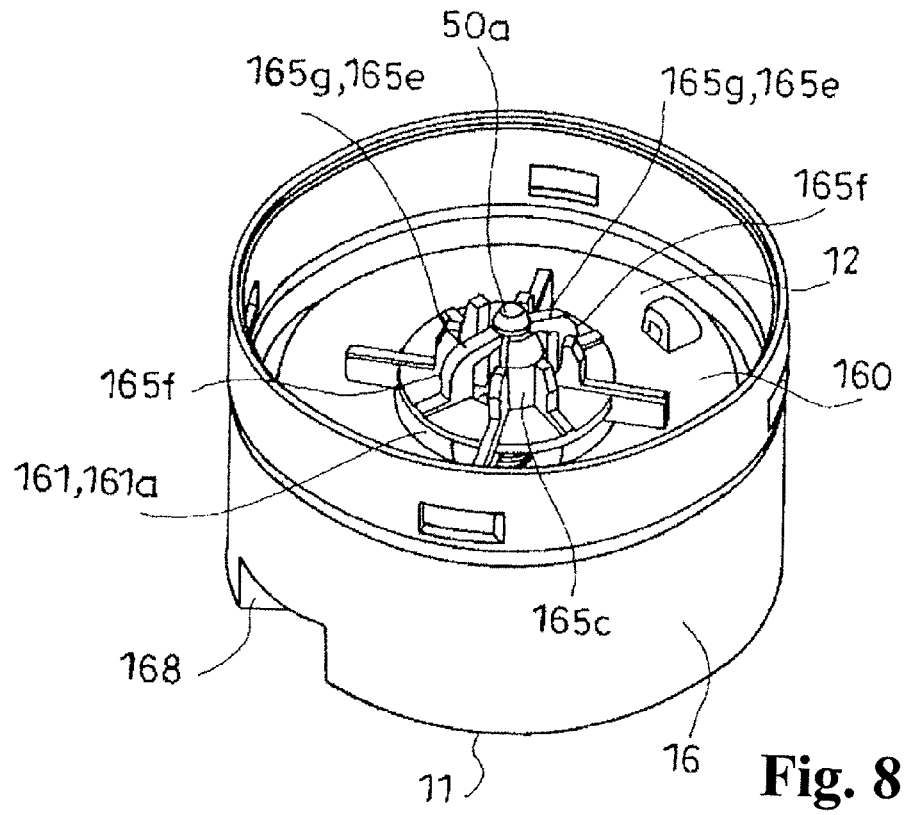
FIG. 8 is a perspective view illustrating an example in which a part of the configuration of the lower body and the lower float body is modified.
Figure 9:
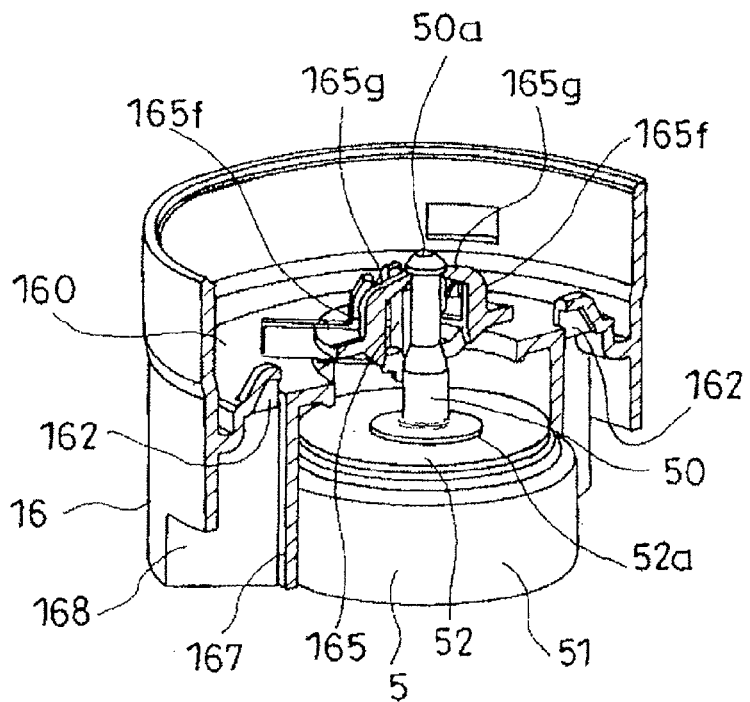
FIG. 9 is a partial sectional perspective view of the modified example in FIG. 8, and the lower float body is in the descended position.
Figure 10:
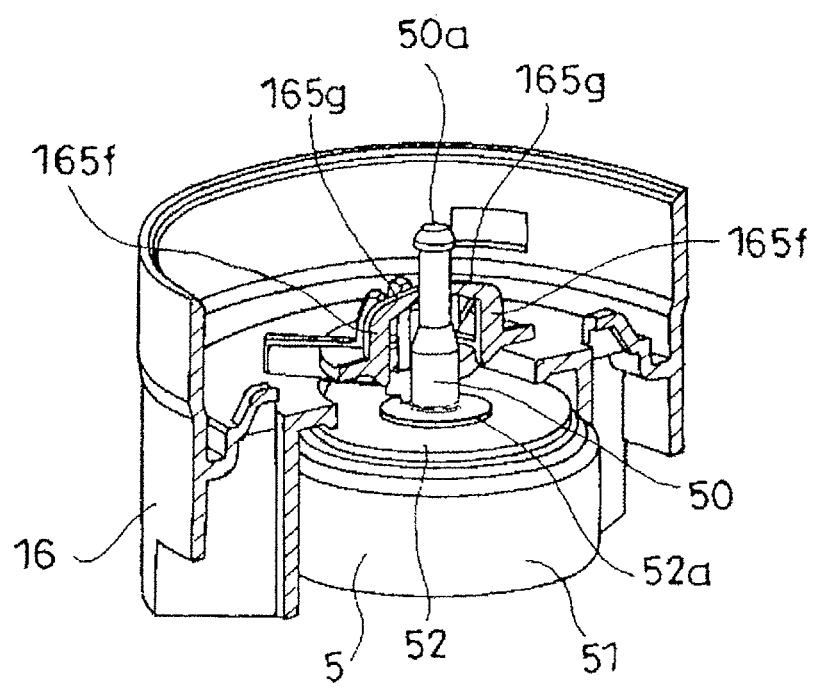
FIG. 10 is a partial sectional perspective view of the modified example in FIG. 8, wherein the lower float body is in the ascended position.

FIGS. 8 to 10 illustrate an example in which a part of the configuration of the lower body 16 and the lower float body 5 constituting the valve device described above is modified.

In this modified example, at least a portion of the coupling part 165$e$ of the insertion part 165 is configured with an arm piece 165$g$ projecting sideways from an upper end of an upwardly projecting base part piece 165$f$ so that the projecting end is coupled with the head part 50$a$. Also, a place on the upper part of the lower float body 5 contacting with the partition 12 at least when ascending is covered by an elastic material.

In this modified example, two elastic pieces 165c in opposite positions of the four elastic pieces 165c constituting the cylindrical support part 165b constituting the insertion part 165 are replaced with the base part piece 165f and the arm piece 155g. The base part piece 165f is positioned further outside from the elastic piece 165c, and a space is formed between the base part piece 165f and the guide shaft 50. The arm piece 165g projects inward from the upper end of this base part piece 165f and is positioned in a position where the projecting end thereof is coupled with the head part 50a. By this, in this modified example, the collision of the head part 50a being contacted from above with the arm piece 165g when the lower float body 5 in the ascended position descends can be absorbed by elastic deformation of the arm piece 165g, and production of a sound of collision in this case can be prevented (FIG. 9).

Also, in this modified example, the closed cylinder upper end of the float main body 51 is covered by a disk-form elastic material 52 having an outer diameter somewhat smaller than the outer diameter of the lower float body 5. A through-hole 52a is formed in the center of the elastic seal material 52, and the elastic seal material 52 is affixed to the cylinder upper end of the float main body 51 with the guide shaft 50 passing through this through-hole 52a. By this, in this modified example, the collision of the contact of the lower float body 5 to the partition 12 when the lower float body 5 in the descended position (FIG. 9) ascends can be absorbed by the elastic sealing material 52 as the elastic material, and production of a sound of collision in this case also can be prevented (FIG. 10).

The entire contents of the specification, claims, drawings, and abstract of Japanese Patent Application No. 2009-286400 filed on Dec. 17, 2009 are incorporated by reference herein as a disclosure of the specification of the present invention.

What is claimed is:

1. A valve device for fuel tank, comprising:
a case having an air flow valve orifice adapted to be communicated with outside of the tank at an upper part thereof, a fuel inflow part arranged below the air flow valve orifice, and a partition formed between the air flow valve orifice and the inflow part to divide the case into an upper chamber and a lower chamber, the partition including a main connect-through part communicating between the lower chamber and the upper chamber, and an insertion part formed on the partition and having an upwardly projecting base part piece projecting upwardly from the partition and a coupling part formed on an upper end of the base part piece;
an upper float body disposed inside the upper chamber of the case, and ascending by fuel flowing into the case to be seated in said air flow valve orifice; and
a lower float body having an upwardly projecting guide shaft including a head part formed on an upper end thereof, the lower float body being supported inside the lower chamber of the case while the guide shaft is vertically movably inserted in the insertion part and passes through the insertion part from below with elastic deformation of the insertion part to couple the head portion with the coupling part, and ascending by the fuel flowing into the case to close the main connect-through part,
wherein said upper float body has a receiving hole to receive the guide shaft of the lower float body,
at least a portion of the coupling part of the insertion part comprises an arm piece projecting sideways from the upper end of the base part piece to couple the head part of the guide shaft at a projecting end of the arm piece, and
the partition includes a dividing wall having a first through-hole formed at a center portion thereof and a second through-hole formed at position outside the first through-hole in a radial direction thereof so that only the first through-hole is closed when the lower float body ascends.

2. A valve device for fuel tank according to claim 1, wherein the lower float body has a portion covered by an elastic material at an upper part thereof to which the partition is contacted at least when ascending.

3. A valve device for fuel tank according to claim 1, wherein the guide shaft of the lower float body is received in the receiving hole of the upper float body at least when the upper float body has not ascended and the lower float body has ascended.

4. A valve device for fuel tank according to claim 1, wherein the partition further includes a disk-form body supported above the first through-hole to form a gap in a vertical direction between the dividing wall and the disk-form body;
the second through-hole is formed as an auxiliary connect-through part, and the gap between the dividing wall and the disk-form body is formed as the main connect-through part; and
the insertion part is formed on the disk-form body, and further includes an insertion hole formed at a center portion thereof in which the guide shaft of the lower float body is inserted, the base part piece being formed around the insertion hole.

5. A valve device for fuel tank according to claim 4, wherein the insertion part is divided into a plurality of elastic pieces including two elastic pieces each having the arm piece at the coupling part thereof.

6. A valve device for fuel tank according to claim 5, wherein the plurality of plastic pieces further includes two plastic pieces each having the coupling part and a sliding-contact part to slidingly contact the guide shaft on an upper end side and on a lower end side thereof.

* * * * *